US011002835B2

(12) United States Patent
Pan et al.

(10) Patent No.: US 11,002,835 B2
(45) Date of Patent: May 11, 2021

(54) DISTRIBUTED LASER RADAR

(71) Applicant: HESAI PHOTONICS TECHNOLOGY CO., LTD., Shanghai (CN)

(72) Inventors: Zhengqing Pan, Shanghai (CN); Liangchen Ye, Shanghai (CN); Shaoqing Xiang, Shanghai (CN); Yifan Li, Shanghai (CN)

(73) Assignee: Hesai Photonics Technology Co., Ltd., Shanghai (CN)

( * ) Notice: Subject to any disclaimer, the term of this patent is extended or adjusted under 35 U.S.C. 154(b) by 0 days.

(21) Appl. No.: 17/037,960

(22) Filed: Sep. 30, 2020

(65) Prior Publication Data
US 2021/0011138 A1 Jan. 14, 2021

Related U.S. Application Data

(63) Continuation of application No. PCT/CN2018/086770, filed on May 14, 2018.

(30) Foreign Application Priority Data

Apr. 3, 2018 (CN) .......................... 201810292141.3

(51) Int. Cl.
*G01S 7/48* (2006.01)
*G01S 7/481* (2006.01)
*G01S 7/00* (2006.01)

(52) U.S. Cl.
CPC ............ *G01S 7/4818* (2013.01); *G01S 7/003* (2013.01); *G01S 7/4817* (2013.01)

(58) Field of Classification Search
None
See application file for complete search history.

(56) References Cited

U.S. PATENT DOCUMENTS 6,665,063 B2 12/2003 Jamieson et al.
7,852,462 B2 12/2010 Breed et al.
(Continued)

FOREIGN PATENT DOCUMENTS

CN 103308923 A 9/2013
CN 103675831 A 3/2014
(Continued)

OTHER PUBLICATIONS

PCT International Search Report and the Written Opinion dated Jan. 4, 2019, issued in related International Application No. PCT/CN2018/086770, with partial English translation (11 pages).
(Continued)

*Primary Examiner* — Hovhannes Baghdasaryan
(74) *Attorney, Agent, or Firm* — Sheppard Mullin Richter & Hampton LLP

(57) ABSTRACT

A distributed LiDAR comprises: an optical transceiver assembly, multiple distributed scanning units, and a distributed optical fiber connector assembly. The optical transceiver assembly includes: a light source emitting detection light, and a light receiving unit used for receiving a detection echo. The multiple distributed scanning units are distributed on the carrier of the distributed LiDAR. The distributed optical fiber connector assembly is in coupled connection with the optical transceiver assembly and the multiple distributed scanning units. The detection light emitted by the light source in the optical transceiver assembly is synchronously transmitted by the distributed optical fiber connector assembly to the multiple distributed scanning units. The multiple distributed scanning units emit the detection light to a detected area with a scanning device, and receive a reflected echo from the detected area. The reflected echo is transmitted to the optical transceiver assembly by the distributed optical fiber connector assembly.

12 Claims, 8 Drawing Sheets

(56) References Cited

U.S. PATENT DOCUMENTS

| | | | |
|---|---|---|---|
| 2012/0206712 A1 | 8/2012 | Chang et al. | |
| 2014/0071428 A1 | 3/2014 | Suzuki et al. | |
| 2017/0153319 A1 | 6/2017 | Villeneuve et al. | |
| 2019/0219698 A1* | 7/2019 | Hoegele | G01S 7/4804 |

FOREIGN PATENT DOCUMENTS

| | | |
|---|---|---|
| CN | 105116416 A | 12/2015 |
| CN | 105547174 A | 5/2016 |
| CN | 106154281 A | 11/2016 |
| CN | 106371085 A | 2/2017 |
| CN | 106646494 A | 5/2017 |
| CN | 107678040 A | 2/2018 |

OTHER PUBLICATIONS

First Office Action and Search Report dated Dec. 12, 2018, issued in related Chinese Application No. 201810292141.3, with English machine translation (19 pages).

Supplementary Search dated Mar. 11, 2019, issued in related Chinese Application No. 201810292141.3 (2 pages).

Second Office Action dated Mar. 19, 2019, issued in related Chinese Application No. 201810292141.3, with English machine translation (10 pages).

Third Office Action dated Jun. 20, 2019, issued in related Chinese Application No. 201810292141.3, with English machine translation (7 pages).

* cited by examiner ically limited. In LiDARs, the
DISTRIBUTED LASER RADAR

CROSS REFERENCE TO RELATED APPLICATIONS

The present application is a continuation of International Application No. PCT/CN2018/086770, filed on May 14, 2018, and entitled "Distributed Laser Radar," which claims the benefit of priority to Chinese Patent Application No. 201810292141.3, filed on Apr. 3, 2018, and entitled "Distributed LiDAR". The above-referenced applications are incorporated herein by reference in their entirety.

TECHNICAL FIELD

The present invention relates to the technical field of radar, and, in particular, to a distributed LiDAR based on optical fiber.

BACKGROUND ART

Barrier detection in autonomous vehicles driving on the road constitutes an important part in the research area of environmental perception technology. In the application of barrier detection, sensors commonly used are LiDAR, camera, millimeter wave radar, ultrasonic sensor and so on. LiDARs measure a distance by measuring a time difference between emitted light and reflected light from the surface of an object. At present, the multi-channel LiDAR available on the market performs scanning of multiple channels by distributing multiple laser emitters in the vertical direction and by the rotation of the electric motor, for example, the 64-channel LiDAR produced by Velodyne. However, a great number of channels in a LiDAR leads to the increased costs, and its application is accordingly limited. In LiDARs, the highest costs lie in the transmitter and the receiver. In order to reduce the costs, LiDARs with a lower number of channels may usually be used for coupling, which is equivalent to a multi-channel LiDAR in terms of effect; meanwhile, the resolution is improved at the time of reducing the costs of the LiDARs. This has become a current focus of research.

At present, one of the common technical solutions is to couple multiple LiDARs. For example, four 16-channel LiDARs are coupled, and upon reasonable design and layout, a control unit is used to control the four LiDARs to meet the purpose of the free combination of mixed solid-state LiDARs point cloud density changes, by the joint calibration of the LiDARs and synchronous data processing, thereby.

SUMMARY

In order to solve the technical problem existing in the prior art, the first aspect of the present invention provides a distributed LiDAR, comprising: an optical transceiver assembly, multiple distributed scanning units, and a distributed optical fiber connector assembly; the optical transceiver assembly (101) includes: a light source, emitting detection light; and a light receiving unit, used for receiving a detection echo; the multiple distributed scanning units are distributed on the carrier of the distributed LiDAR; and the distributed optical fiber connector assembly is in coupled connection with the optical transceiver assembly and the multiple distributed scanning units; the detection light emitted by the light source in the optical transceiver assembly is coupled to the distributed optical fiber connector assembly, and synchronously transmitted by the distributed optical fiber connector assembly to the multiple distributed scanning units; the multiple distributed scanning units emit the detection light to a detected area by means of a scanning device, and receive a reflected echo from the detected area; and the reflected echo is transmitted to the optical transceiver assembly by the distributed optical fiber connector assembly, and received by the light receiving unit in the optical transceiver assembly.

The second aspect of the present invention provides an alternative distributed LiDAR, comprising: an internal optical assembly, distributed scanning units, and an optical fiber connector assembly; the internal optical assembly is arranged inside a carrier and at least comprises: a light source for emitting detection light; and a light receiving unit for receiving the detection light; the distributed scanning units are distributed on the carrier; the optical fiber connector assembly is in coupled connection with the internal optical assembly and meanwhile in coupled connection with the distributed scanning units; and the detection light emitted by the light source in the internal optical assembly is coupled to the distributed optical fiber connector assembly, and transmitted by the distributed optical fiber connector assembly to the distributed scanning units; the distributed scanning units emit the detection light to a detected area by means of a scanning device, and receive a reflected echo from the detected area; and the reflected echo is transmitted to the internal optical assembly by the distributed optical fiber connector assembly, and received by the light receiving unit.

The present invention can achieve the following beneficial effects:

The distributed scanning units share one set of laser emitter and laser detector, as well as the relevant electronic components. By means of the arrangement and combination of the distributed scanning units can the current problems about high costs and large volume be solved at the time of coupling multiple LiDARs; meanwhile, multiple LiDARs with a small number of channels are used to improve the vertical resolution

BRIEF DESCRIPTION OF THE DRAWINGS

Detailed description of the specific implementation modes of the present invention will be further made below with reference to the drawings.

DETAILED DESCRIPTION

In order to make those skilled in the art better understand the solution of the description, the technical solutions in the embodiments of the description will be described below in a clear and complete manner with reference to the drawings appended to the embodiments. Obviously, the embodiments set forth herein are not all, but only some, of the embodiments of the description. Furthermore, any other embodiment obtained by those skilled the art based on the embodiments in the description without putting into any creative labor shall fall into the scope of protection defined in the description.

Figure 1:
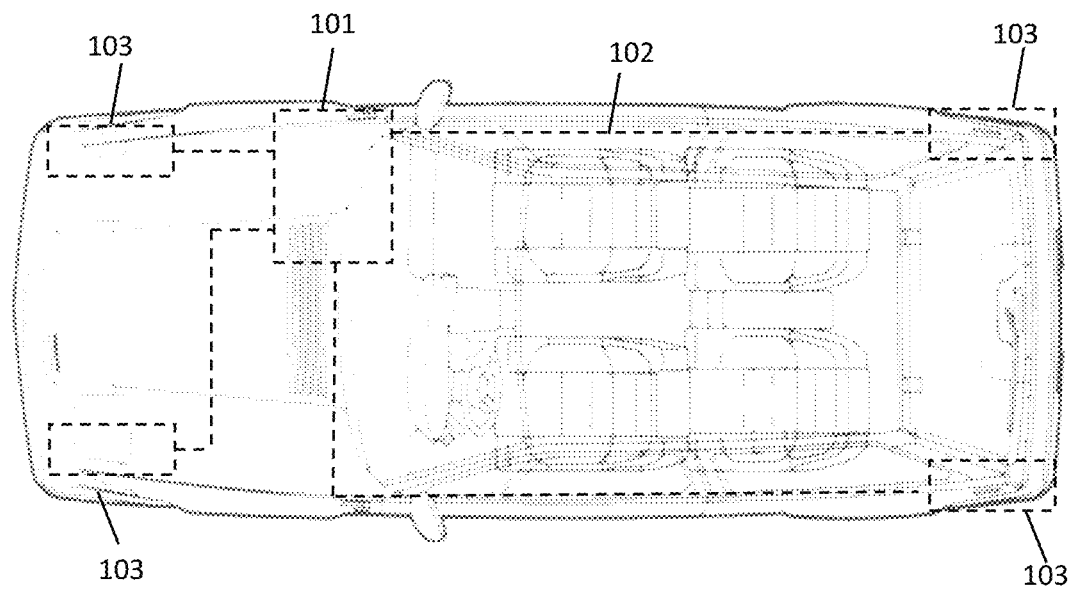
FIG. 1 is a structural diagram of a distributed LiDAR provided by one embodiment of the description.

In one embodiment of the description, as shown in FIG. 1, the LiDAR comprises: an optical transceiver assembly 101, multiple distributed scanning units 103, and a distributed optical fiber connector assembly 102; the optical transceiver assembly 101 includes: a light source, emitting detection light; and a light receiving unit, used for receiving a detection echo; the multiple distributed scanning units 103 are distributed on the carrier of the distributed LiDAR; and the distributed optical fiber connector assembly 102 is in coupled connection with the optical transceiver assembly 101 and the multiple distributed scanning units 103; the detection light emitted by the light source in the optical transceiver assembly 101 is coupled to the distributed optical fiber connector assembly 102, and synchronously transmitted by the distributed optical fiber connector assembly 102 to the multiple distributed scanning units 103; the multiple distributed scanning units 103 emit the detection light to a detected area by means of a scanning device, and receive a reflected echo from the detected area; and the reflected echo is transmitted to the optical transceiver assembly 101 by the distributed optical fiber connector assembly 102, and received by the light receiving unit in the optical transceiver assembly 101.

The optical transceiver assembly 101 at least includes: a light source, used for emitting detection light; and a light receiving unit, used for receiving a detection light. In one possible embodiment, the light source may be selected from an edge emitting semiconductor laser, a surface emitting semiconductor laser, a heterojunction laser, a strip laser, a GaAlAs/GaAs laser, an InGaAsP/InP laser, a quantum well laser, a microcavity laser and the like. The wave band of the detection light may be selected as a near-infrared band, such as 960 nm, 1320 nm or 1550 nm, and the emission power is selected within the safe range for human eyes. After emitted by the light source in the optical transceiver assembly 101, the detection light is coupled to the distributed optical fiber connector assembly 102; and there are various modes of coupling between the light source and the optical fiber.

Figure 2:
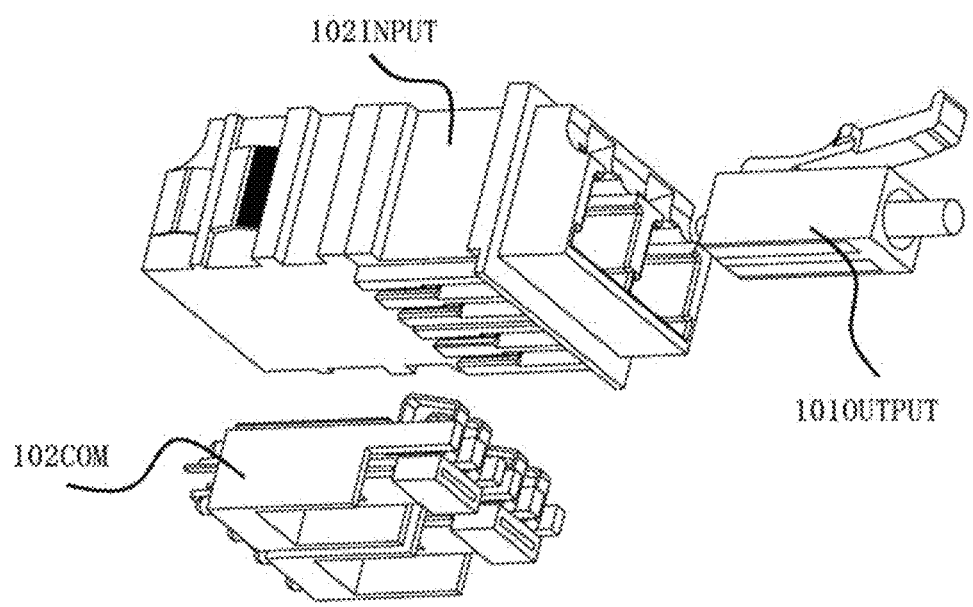
FIG. 2 is a structural diagram of an optical coupling device of the distributed LiDAR provided by one embodiment of the description.

In one possible embodiment, as shown in FIG. 2, the detection light emitted by the optical transceiver assembly 101 is input into an optical coupler through Port 101OUTPUT, which is connected with Port 102INPUT, i.e., the input port of the distributed optical connector assembly 102, such that the coupled connection between Port 102INPUT and 102COM enables the coupling of the emergent light from Port 101OUTPUT with the light from the optical fiber in 102COM, thereby achieving the coupled connection between the emergent light of the internal optical assembly and the optical fiber connector assembly. In FIG. 2, the number of the coupled optical fibers in 102COM is 4, which are connected to the distributed scanning devices at the left front, right front, left rear and right rear of the carrier, respectively. According to the actual needs for detection, 102COM may also be provided with more optical fiber interfaces. For example, 101OUTPUT can be coupled to 102COM with 10 ports or 12 ports, such that the left front, right front, left rear and right rear of the carrier correspond to two or three optical fibers or even more, respectively. Surely, such numbers are exemplary only. In the description, the number of coupled optical fibers is not limited.

Figure 3:
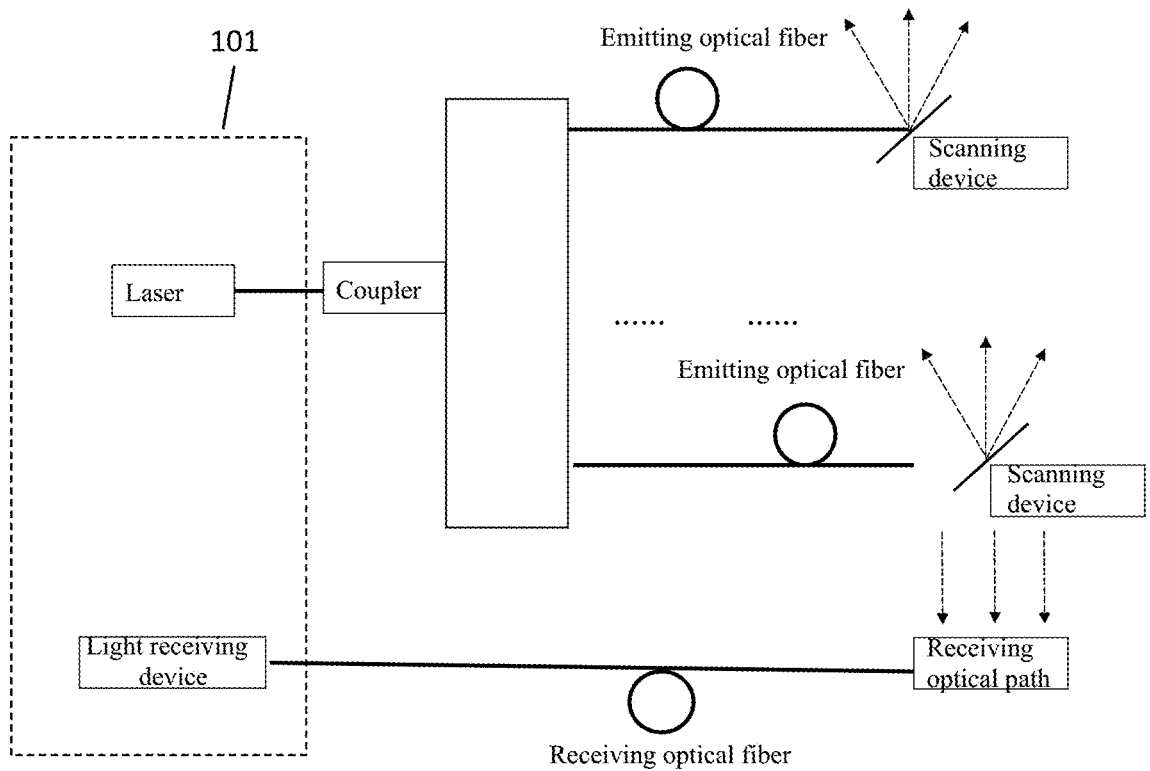
FIG. 3 is a schematic diagram illustrating the scanning principle of the distributed LiDAR provided by one embodiment of the description.

In one possible embodiment, as shown in FIG. 3, the distributed optical connector assembly 102 is implemented by optical fibers. That is, the detection light emitted by the optical transceiver assembly 101 is coupled into the optical fibers by a coupler, and then the light is transmitted to the distributed optical scanning devices 103 by means of pure optical fiber connection. At the distributed light scanning devices 103, the detection light is emitted from the end face of the optical fiber. By then, the end face of the optical fiber becomes an equivalent light source, and the detection light emitted therefrom is reflected by the scanning units onto an area to be detected.

Figure 4:
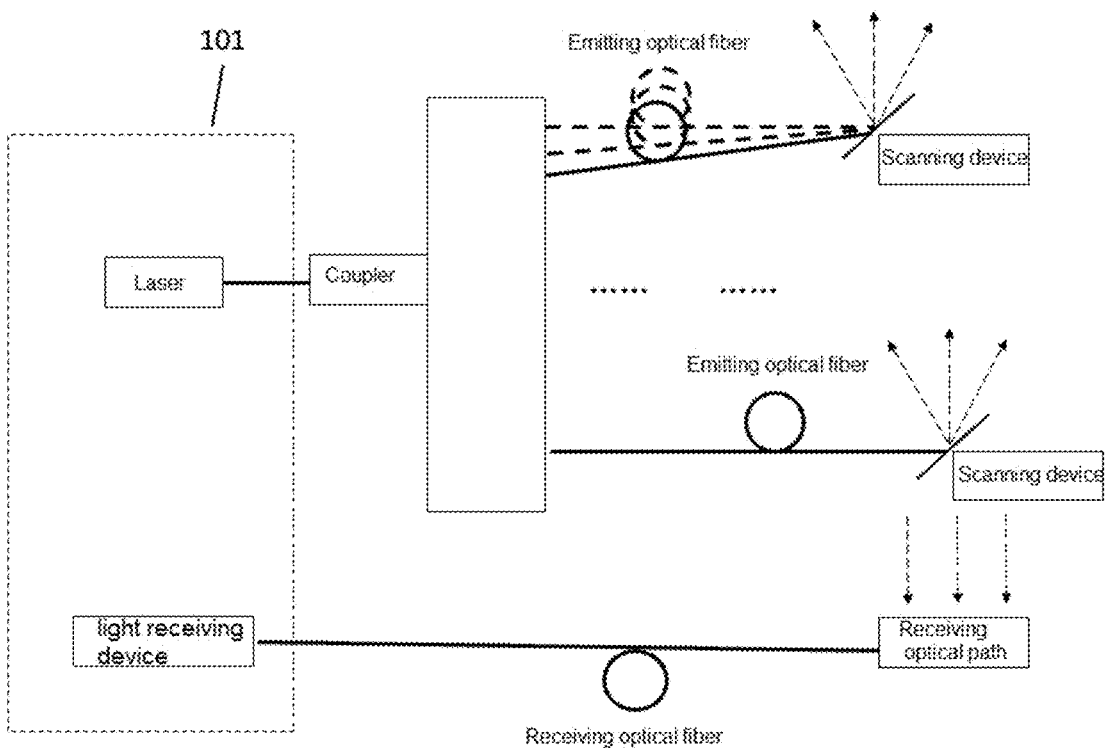
FIG. 4 is a schematic diagram illustrating the scanning principle of the distributed LiDAR provided by one embodiment of the description.

In one possible embodiment, as shown in FIG. 4, each of the distributed scanning units is connected with multiple optical fibers, which form multiple equivalent light sources, and the detection light emitted from the multiple optical fibers is incident to the scanning units at different angles. In the embodiment illustrated in FIG. 4, the multiple optical fibers form different incident angles relative to the scanning units by setting the orientation angle of the optical fibers, and when driven by the scanning units, the incident beams of light form a scanning field of view (FOV).

Scanning frequency and scanning amplitude are two important factors that affect detecting and imaging. Scanning frequency determines the resolution of imaging, and scanning amplitude defines the detecting range of imaging. In general conditions, it is difficult to simultaneously consider both the scanning resolution and the detecting range. In order to gain a high scanning resolution, scanning components need to vibrate at a high frequency. In this case, the requirement for a large scanning range may be hardly satisfied. On the other hand, a too small scanning range is impossible due to the requirements of the LiDAR per se.

For example, in the embodiment illustrated in FIG. 4, multiple equivalent light sources are formed using multiple optical fibers, and this ensures the scanning range in addition to the scanning resolution. By adjusting the end faces of multiple optical fibers for emitting light, the emergent light from optical fibers is incident onto the reflecting surfaces of the scanning units, and the fields of view formed by the scanning of the incident light can overlap partially or just be spliced exactly. In this way, a large detection FOV can be ensured when the scanning units maintain a high scanning frequency. Theoretically, by increasing the number of optical fibers providing equivalent light sources, the maximum range for the FOV can be obtained when the scanning frequency remains the same.

In the embodiment of the description, it is, undoubtedly, very advantageous to use the light emitted from the end faces of the optical fibers as an equivalent light source. First of all, by means of coupling, the light source can be arranged only in the optical transceiver assembly without any light source provided at other positions. This can greatly reduce the number of light sources and the number of optical transceiver assemblies, which can considerably reduce the costs without question. Second, the traditional scanning method does not allow for the arrangement of many lasers around one scanning unit because the laser per se has a certain volume, and then space limits the implementation of multiple light sources; while by using equivalent light sources from optical fibers, multiple equivalent light sources can be arranged in one scanning unit, which significantly improves the space utilization; furthermore, since the emergent end face of the optical fiber is only a point, it is then quite easy to adjust the emergent angle of the optical fiber and control the scanned area. And third, the synchronization of the detection light can be well controlled by means of optical fiber coupling.

Figure 5:
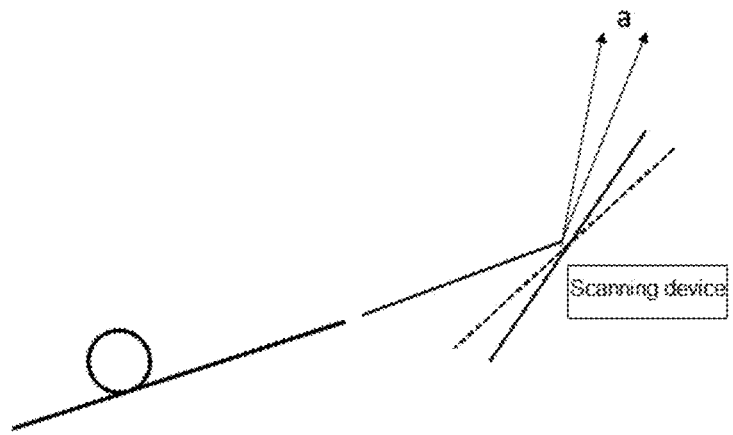
FIG. 5 is a schematic diagram illustrating the principle of a scanning device based on a multi-fiber equivalent light source provided by one embodiment of the description.

The exemplary description is made below according to FIGS. 5-8:

As shown in FIG. 5, a laser emitted from the end face of an optical fiber as an equivalent light source is incident onto the reflecting surface of the scanner and forms FOV a.

Figure 6:
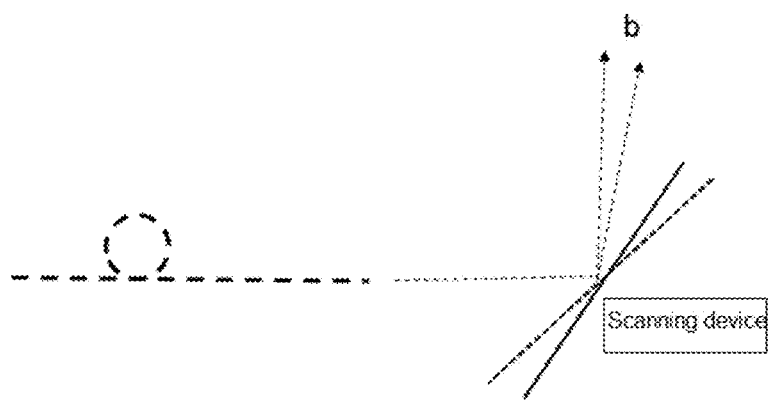
FIG. 6 is a schematic diagram illustrating the principle of a scanning device based on a multi-fiber equivalent light source provided by one embodiment of the description.

As shown in FIG. 6, by adjusting the emergent angle of the optical fiber, a laser emitted from the end face of a second optical fiber as an equivalent light source is incident onto the reflecting surface of the scanner and forms FOV b.

Figure 7:
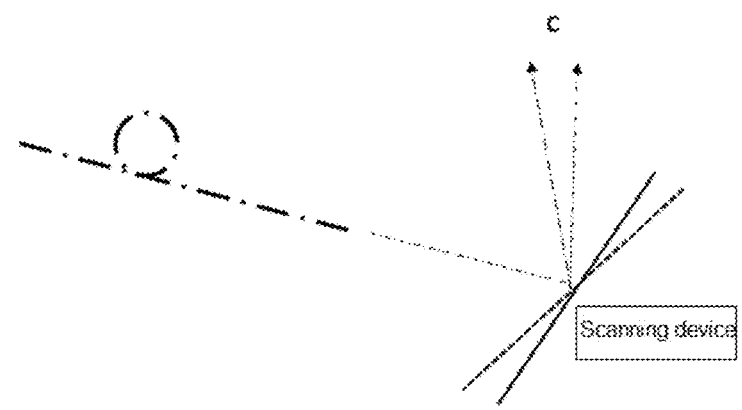
FIG. 7 is a schematic diagram illustrating the principle of a scanning device based on a multi-fiber equivalent light source provided by one embodiment of the description.

As shown in FIG. 7, by adjusting the emergent angle of the optical fiber, a laser emitted from the end face of a third optical fiber as an equivalent light source is incident onto the reflecting surface of the scanner and forms FOV c.

Figure 8:
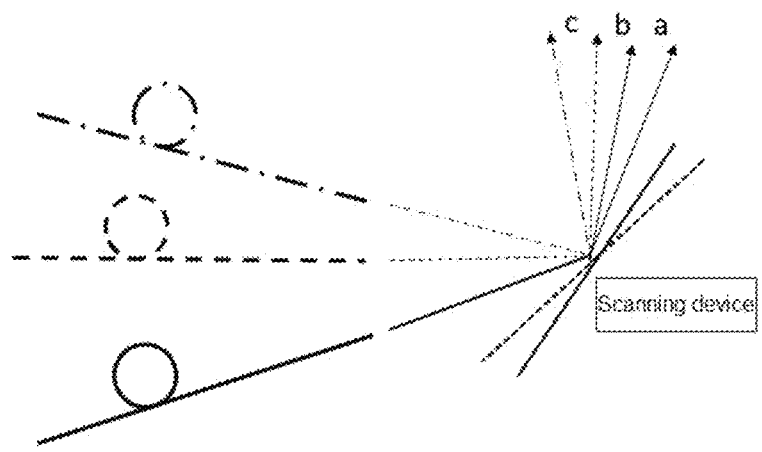
FIG. 8 is a schematic diagram illustrating the principle of a scanning device based on a multi-fiber equivalent light source provided by one embodiment of the description.

As shown in FIG. 8, a compound field of view formed by the scanned beams of light emergent from the three optical fibers is a superposition of FOV a, FOV b and FOV c. In the three sub-FOVs a, b and c, the resolution of the LiDAR will not be affected because the scanning units maintain a high scanning frequency.

Certainly, FIGS. 5-8 only serves as an example to illustrate that by setting the number of optical fibers, such as increasing or decreasing the number of the optical fibers as an equivalent light source, the resolution of a LiDAR can be surely improved when the field of view maintains unchanged. In addition, introducing multiple equivalent light sources is equivalent to dividing the FOV to be detected into multiple portions, such that a higher scanning frequency can be obtained by sacrificing the scanning amplitude, thereby improving the upper limit of the resolution of the same scanning units. For example, for a single light source, the scanning units are designed to have a scanning frequency of 85 Hz, and a scanning angle of the scanning mirror of ±5°; while for multiple equivalent light sources, the scanning angle of the scanning mirror can be reduced to ±3°, which then can increase the upper limit of the scanning frequency of the scanning unit to 130 Hz.

Figure 9:
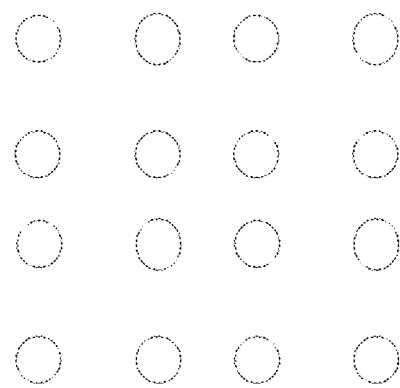
FIG. 9 is a diagram of a two-dimensional optical fiber array provided by one embodiment of the description.
Figure 10:
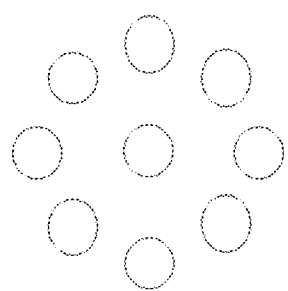
FIG. 10 is a diagram of a two-dimensional optical fiber array provided by one embodiment of the description.

Meanwhile, the exemplary process described in FIGS. 5-8 is more applicable to one-dimensional scanning or some two-dimensional scanning with a lower degree of complexity. In some cases, the optical fiber can also provide a light source for the scanning unit in the form of an arrayed light source. As shown in FIG. 9, the optical fibers are spatially arranged in the form of a two-dimensional array, and are incident onto the reflecting surface of the scanning components at a certain angle. After a two-dimensional scanning by the scanning components, multiple two-dimensional sub optical fields are formed, the superposition of which forms a coverage of the detected area. The optical fibers in FIG. 9 form a two-dimensional equivalent light source array in the form of a 4×4 two-dimensional array. In fact, according to different scanning components and different requirements of the distributed optical scanning 103 for working scenes, the two-dimensional array can also be a circular array as shown in FIG. 10. Without loss of generality, 2×2, 3×2, 2×3, 3×3, etc., for example, are the M×N rectangular arrays suitable for the superposition of various sub optical fields.

The light-outputting end faces of the distributed optical fiber connector assembly 102 are arranged into the form of a spatial two-dimensional array, which may facilitate the combination and superposition of the spatial two-dimensional FOVs. However, a two-dimensional array requires each optical fiber therein to have a fixed orientation and a fixed angle, and also careful installation and adjustment are needed to achieve so. During use, external vibration and other factors also tend to cause the position and/or orientation of the optical fibers to change, thereby resulting in changes to the FOV as set originally.

Therefore, in one possible embodiment, a fixture is used to fix the optical fibers as an equivalent light source in an one-dimensional array, and the orientation of the bodies of optical fibers is substantially parallel to one another. The position of an optical fiber can be stably controlled by a one-dimensional array of the fixture; furthermore, the light-outputting direction of the end faces of the optical fibers can be controlled by the one-dimensional array of the fixture, such that the fixture can still hold the end faces of the optical fibers firmly even if imposed with an external force such as vibration, so as to ensure the stability of the system.

Figure 11:
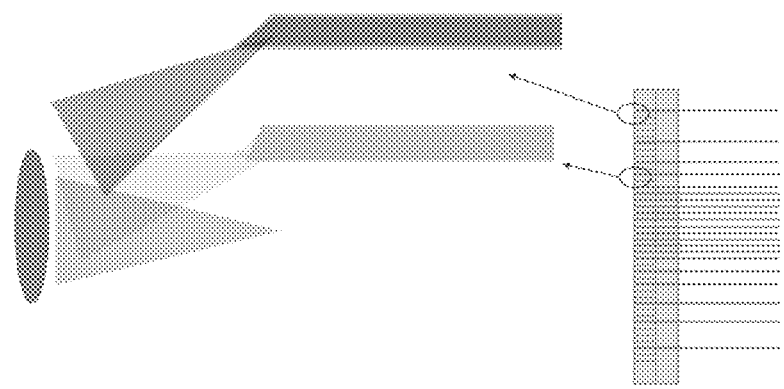
FIG. 11 is a schematic diagram of an optical fiber array with an optical fiber fixture provided by one embodiment of the description.
Figure 12:
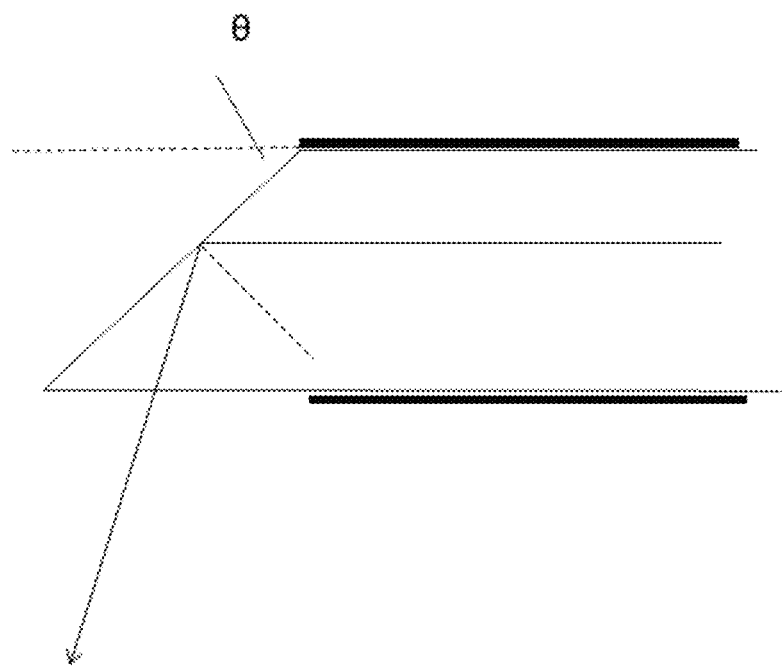
FIG. 12 is a schematic diagram illustrating the principle of the total reflection at the end face of an optical fiber provided by one embodiment of the description.

In one possible embodiment, as shown in FIG. 11, in addition to fixing an optical fiber as an equivalent light source with a fixture, the light-outputting surface of the optical fiber can also be processed. According to Maxwell's equation, when the light-outputting surface of the optical fiber is a flat cross-section, the wave front of the emergent light field is a conical surface. For a one-dimensional fixture, in order to make the light emitted by multiple optical fibers converge to a scanning surface or a focus lens, it can be achieved by cutting the end face of the optical fiber. For example, in FIGS. 11 and 12, the end face of the optical fiber is obliquely cut into different angles, and the following condition is satisfied by controlling the cutting angle:

$$c = \arcsin\frac{n2}{n1}$$

Wherein $n_2$ is the refractive index of air, $n_1$ is the refractive index of an optical fiber, and C represents the critical angle of cutting. When the angle θ of the cut end face of the optical fiber is less than the critical angle C, the detection light incident in parallel from the optical fibers will be total-reflected on the cut end face, so as to change the direction of the light emitted from the optical fiber without changing the direction of the optical fibers per se (since the optical fibers are parallel). In FIGS. 11 and 12, the light emitted from the optical fibers is incident onto the surface of the lens at different angles. In some embodiments, a converging lens can also be omitted, and the emergent light is incident onto the reflecting mirror by means of cutting the end face of the optical fiber at different angles, so as to achieve that the optical fields can overlap or just be spliced exactly.

Meanwhile, a receiving optical path receives reflected echoes from the target detected area and transmits the received detection light to the optical transceiver assembly through a receiving optical fiber, and a light receiving unit converts the detection echoes into electrical signals.

In one possible embodiment, the distributed scanning units, upon receiving echo signal, may also transmit the echo signal without using an optical fiber. Instead, they may directly convert the echo signal into an electrical signal according to a light receiving unit arranged at the distributed scanning units, and then perform the transmission of the electrical signal. Furthermore, the way of transmitting the electric signal can be selected from wired transmission or wireless transmission. The wired transmission can be achieved by adopting the electric signal transmission mode, for example, by a coaxial cable, while the wireless transmission can be carried out by transmitting, based on a wireless transmission chip, processed electrical signals to, for example, a driving assistance system or signal processing system to do the unified signal processing, so as to enable the identification of the barriers in a target area.

In one possible embodiment, the light receiving unit is selected from an APD (i.e., Avalanche Photo Diode) detecting unit, especially a one-dimensional linear array APD or a multi linear array APD. a three-dimensional image of a target can be obtained just after a single laser pulse based on the flood lighting of the APD array onto a target scene. Compared with the single-point scanning mode, this exhibits many advantages, for example, APD imaging requires no scanner, thereby making it easier to miniaturize the system; a low demand for laser frequency and power, and a reduced requirement for the beam alignment between the transmitting and receiving systems; and the capabilities of overcoming motion blur and imaging a moving target, high frame rate and penetration of imaging.

Still as shown in FIG. 1, the distributed scanning units 103 are arranged outside the carrier; and the distributed optical fiber connector assembly 102 is in coupled connection with the optical transceiver assembly 101 and simultaneously with the distributed scanning units 103. The distributed scanning units 103 are arranged on the periphery outside the carrier. It should be indicated that although the vehicle is taken as an example of the carrier in FIG. 1, this does not constitute limitation of the embodiment of the description since the carrier may also be a transportation means of another type, such as various models of aircraft, vehicles, ships, etc., all of which may be adopted as the carrier set forth in the embodiments of the description as long as it can carry units described herein.

Figure 13:
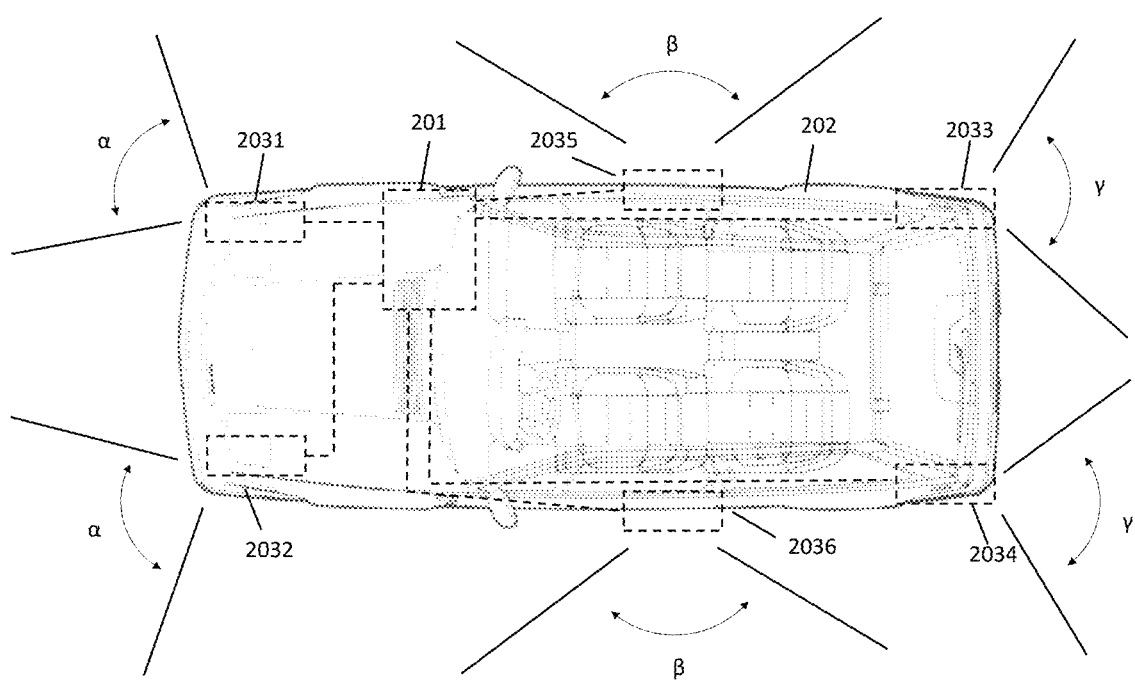
FIG. 13 is a schematic diagram of scanned areas on the carrier provided by one embodiment of the description.

Meanwhile, FIG. 1 does not play a limitative role in the mode and position of arrangement of the distributed scanning units. In the embodiment illustrated in FIG. 1, the distributed scanning units 103 are distributed at four positions at the four corners of the carrier, the scanning range of which covers the motion states of the carrier, such as linear motion, turning, etc., during its motion. However, other modes of arrangement of the distributed scanning units are not excluded. As shown in FIG. 13, in addition to a first distributed scanning unit 2031, a second distributed scanning unit 2032, a third distributed scanning unit 2033 and a fourth distributed scanning unit 2034 arranged at the four corners of the carrier, two more groups of distributed scanning units, i.e., a fifth distributed scanning unit 2035 and a sixth distributed scanning unit 2036, are arranged on both sides of the carrier. Among them, the first distributed scanning unit 2031, the second distributed scanning unit 2032, the third distributed scanning unit 2033 and the fourth distributed scanning unit 2034 detect areas at four corners of the carrier, respectively, while the fifth distributed scanning unit 2035 and the sixth distributed scanning unit 2036 are used to detect areas at both sides of the carrier.

Figure 14:
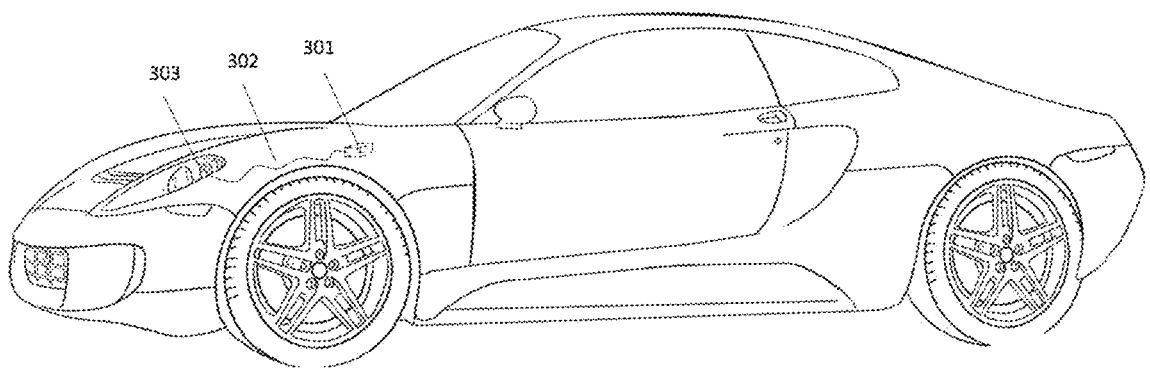
FIG. 14 is a diagram showing the distribution of an internal optical assembly provided by one embodiment of the description.

In one possible embodiment of the description, the internal optical assembly may be arranged inside the carrier. In the structure as shown in FIG. 14, the internal optical assembly may be arranged inside the engine compartment of the vehicle as the carrier, or in the cockpit of the vehicle. In the engine compartment or in the cockpit of the vehicle, the temperature changes very slightly, or even can be considered as substantially constant. Because the laser device and the photodetector used in LiDAR are easily interfered by the ambient temperature, the detection precision and accuracy of those common external LiDAR components will be affected in the event of bad weather. The impact of bad weather on LiDAR can be lessened to a great extent by arranging the internal optical assembly inside the carrier. For example, in cold weather, since the temperature inside the carrier is substantially constant, the laser device and the photodetector will not be affected by the ambient temperature, but continue to emit detection light within the range of the constant temperature in the carrier. Therefore, there is no need to carry out temperature calibration for the laser device according to the temperature.

In one alternative embodiment, when the carrier is a vehicle, the internal optical assembly may be arranged adjacent to the lines of the air conditioner inside the vehicle so as to use the effect of the temperature adjustment made by the air conditioner to achieve the temperature adjustment to the internal optical assembly. In this way, due to the effect of the air conditioning system, the ambient temperature of the internal optical assembly, in the course of the vehicle travelling, is substantially within a constant temperature range, thereby avoiding the impact on the optical assembly, when arranged outside, made by the temperature difference between day and night (the maximum of which can reach 20 degrees) and the seasonal temperature difference (the maximum of which can reach 50 degrees). As can be found, there is no need to do temperature calibration in a large temperature range when the internal optical assembly is used.

The arrangement of the internal optical assembly can also protect the light source and the light receiving unit therein from the impact of rain and humidity, thereby avoiding the potential risk of a short circuit of electrical components and prolonging the service life of circuits and elements.

Figure 15:
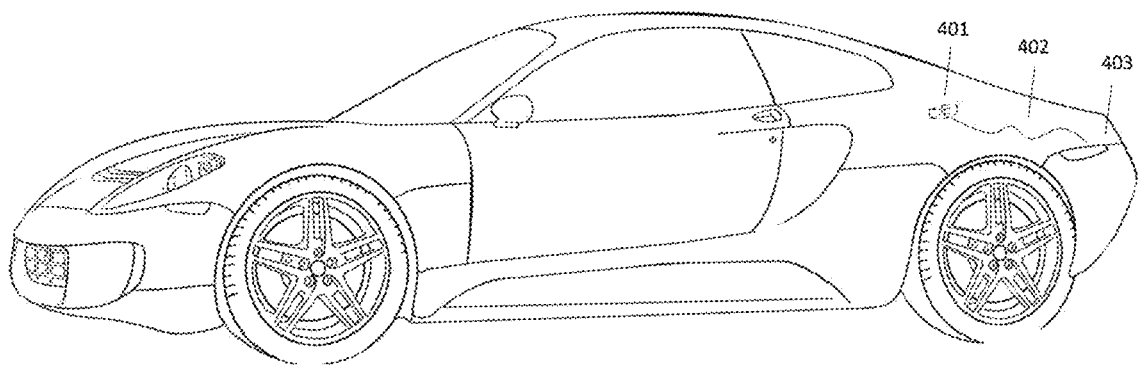
FIG. 15 is a diagram showing the distribution of an internal optical assembly provided by one embodiment of the description.
Figure 16:
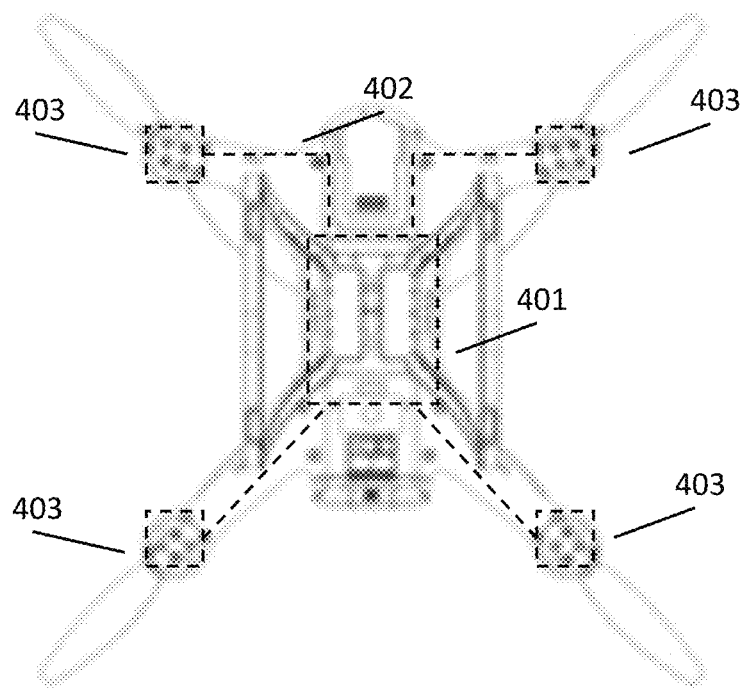
FIG. 16 is a structural diagram of the carrier of a drone provided by one embodiment of the description.
Figure 17:
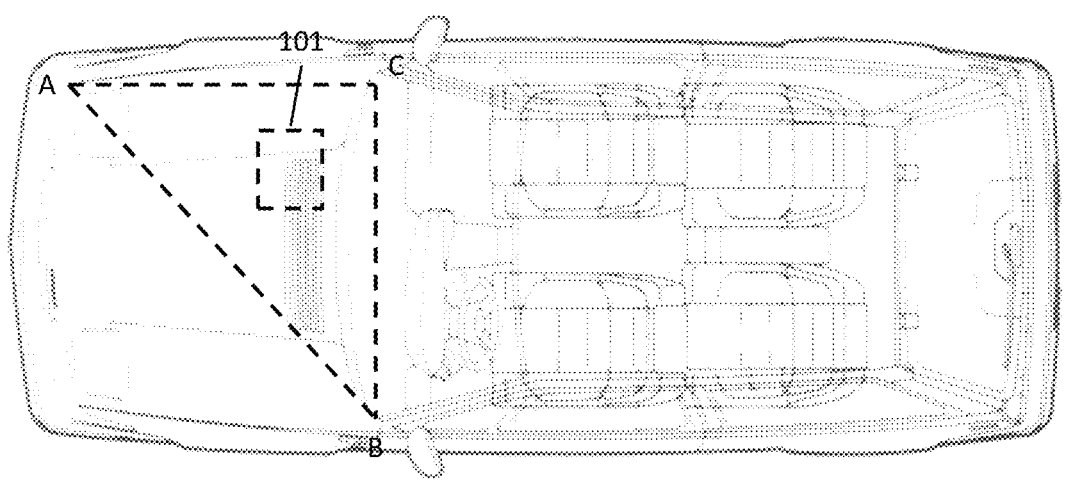
FIG. 17 is a diagram showing the distribution of an internal optical assembly provided by one embodiment of the description.

When the internal optical assembly is arranged in the engine compartment or cockpit of the vehicle, this can lessen the impact of vibration on the internal optical assembly. In one alternative embodiment, as shown in FIG. 15, the internal optical assembly 101 may be arranged at the center of gravity of the triangle ABC formed by the support frame of the engine compartment. At the center of gravity, the impact of the vibration of the carrier on the internal optical assembly is minimized, so as to ensure that the light generating and light receiving devices are least affected by the vibration during the operation of the carrier.

Certainly, since a carrier such as vehicle is usually in an operating state during the operation of LiDAR, the vibration of the carrier will cause tiny displacement or deformation to the elements in the optical path, and such tiny displacement or deformation, if accumulated, will lead to the reduced detection precision. However, in the case of the distributed LiDAR, since light emitted by the light source is transmitted to distributed scanning components by means of coupling, the vibration exerts less impact on the whole scanning process, which can undoubtedly improve the detection precision.

In the embodiments set forth above, the distributed scanning units are arranged in more cases for the purpose of driving assistance. When applied to the scenario of autonomous driving, the distributed scanning units can also be arranged in other ways. The current classification of the autonomous driving technology is shown in Table 1 below.

provide information about surrounding barriers for the purpose of the normal driving of the vehicle.

As stated above, there is no specific limitation of the carrier in the description. The carrier may also be an aircraft, such as the drone shown in FIG. 5, which is equipped with a distributed LiDAR system also comprising an internal optical assembly 401, a distributed optical connector assembly 402, and distributed scanning units 403. The drone comprises a body and four wings of the drone, propellers arranged on the four wings of the drone, and a landing gear arranged on the lower portion of the body. The internal optical assembly 401 is arranged inside the body of the drone, and the distributed scanning units 403 are arranged on the four wings of the drone. The internal optical assembly 401, arranged in the interior of the drone body, at least includes: a light source for emitting detection light; and a light receiving unit for receiving the detection light.

The detection light emitted by the light source in the internal optical assembly 401 is transmitted by the distributed optical connector assembly 402 to the distributed scanning units 403 on the four wings of the drone. The

TABLE 1 the U.S. National Highway Traffic Safety Administration (NHTSA)'s
Classification of the Autonomous Driving Technology

| Level | Definition | Interpretation |
|---|---|---|
| No Automation (Level 0) | The driver controls the major basic control components of the vehicle at all time | The driver completely owns the sole right of control |
| Part-functional Automation (Level 1) | The vehicle comprises one or two specific control functions | For example, the vehicle equipped with electronic stability control or pre-charged braking can automatically offer assistance in braking, such that the driver can regain the control of the vehicle or assist the vehicle to stop faster |
| Multi-functional Automation (Level 2) | The vehicle comprises at least two major basic automatic control functions, which are designed with the expectation that collaboration reduces the control of the driver | For example, self-adaptive cruising control in combination with the lane centering function |
| Conditional Automation (Level 3) | In particular traffic or environmental conditions or to a large extent, the vehicle per se can detect changes in the external environment, or require the right of control to be transferred back to the driver, such that the driver can be free from all safety-related functions | The driver may be required to perform operation occasionally, but is provided with the transition time comfortable enough. Google's autonomous car serves as an example for Conditional Automation |
| Full Automation (Level 4) | The vehicle per se can operate all safety-related driving functions and detect the road conditions during the whole driving process | The driver only needs to provide a destination or navigation information, and does not need to provide any control in the process of driving, which is adaptive to vehicles with or without passengers |

When applied to the scenarios of Conditional Automation (Level 3) or Full Automation (Level 4), the sensors carried on the carrier need to achieve an all-round coverage with regard to driving. As shown in FIG. 12, an internal optical assembly 201 is arranged inside the carrier, and a first distributed scanning unit 2031, a second distributed scanning unit 2032, a third distributed scanning unit 2033 and a fourth distributed scanning unit 2034 are arranged at the left front, right front, left rear and right rear of the vehicle as the carrier, respectively. In addition, a fifth distributed scanning unit 2035 and a sixth distributed scanning unit 2036 may be arranged at both sides of the vehicle as the carrier. According to the motion mode and state of the vehicle carrier, the scanning mode of the distributed scanning units are set to distributed scanning units 403 can scan the detection light and emit the detection light to a target area to achieve the detection of the target area.

As for the specific implementation of a scanning unit in the distributed scanning units, galvanometer may be selected, such as electrostatic galvanometer, electromagnetic galvanometer, piezoelectric galvanometer and electrothermal galvanometer. Rotating mirror may also be selected, such as rotating prism, rotating cylindrical mirror, rotating cone mirror and so on. In the process of swinging, the scanning unit can scan to different detected areas the light source obtained by means of coupling of the distributed optical connector assembly.

Laser emitted by the distributed scanning units 403 is reflected to different positions within the visual field. The emitted laser beam, after reflected by a target object (or barrier), is incident on a receiving and converging device through the scanning device. The converging device may be a lens or a lens group, which is used for converging divergent light, and the converged light beam is transmitted to the light receiving device in the internal optical assembly 401 through one or more optical fibers.

In the internal optical assembly 401, the detector is composed of one or more detection arrays, including but not limited to PIN, APD, GM-APD and other photoelectric sensors, and covered thereon with a filter corresponding to the emission wavelength of the laser device, thereby ensuring that only the light of a corresponding wavelength can pass through the filter and then be received by the photosensitive portion of the detector.

By recording a time difference between the laser emission and the reception of an echo signal, the detector calculates the time of flight of laser, thereby obtaining the distance information of the object to be measured at this point.

In one alternative embodiment, the emission of the light source in the internal optical assembly and the reception of the detection light by the receiving assembly are controlled according to the motion behavior of the carrier.

For example, in the embodiment illustrated in FIG. 13, when the vehicle as a carrier turns right, an internal optical assembly 301 increases the output power of the right sensor and the front sensor according to the control signal from a direction sensor to increase a detection distance at the corresponding positions. Or, the number of equivalent light sources in the corresponding direction is increased. For example, detection light emitted from the light source is originally coupled to an optical fiber to form an equivalent light source, while other optical fibers are idle; and at the time of turning, the idle optical fibers are activated to provide more equivalent light sources to increase the azimuth resolution.

Certainly, at the time of controlling a light source, the scanning frequency of a scanner can also be controlled simultaneously. For example, scanning is performed at a higher frequency to increase the scanning resolution.

In one possible embodiment, an optical amplification unit is arranged on the optical fiber in the distributed optical connector assembly. The intensity of the emergent light from the end face of the optical fiber is adjusted by the optical amplification unit. For example, when a vehicle carrier is turning, the optical amplification unit can be used to increase a detection distance.

In one possible embodiment, an optical modulation unit is arranged on the optical fiber in the distributed optical connection assembly, and the emergent light from different optical fibers is modulated to differentiate detection light emitted to different detected areas.

The above description of the disclosed embodiments enables those skilled in the art to achieve or utilize the present invention. Various modifications to such embodiments will be obvious to those skilled in the art, and the general principles defined herein may be implemented in other embodiments without departing from the spirit or scope of the present invention. Therefore, the present invention will not be limited to such embodiments displayed herein, but intend to conform to the widest range as consistent with the principles and novel features disclosed herein.

We claim:

1. A distributed LiDAR, comprising: an optical transceiver assembly, multiple distributed scanning units, and a distributed optical fiber connector assembly, wherein
the optical transceiver assembly comprises a light source configured to emit detection light;
the multiple distributed scanning units are distributed on a carrier of the distributed LiDAR;
the distributed optical fiber connector assembly is in connection with the optical transceiver assembly and the multiple distributed scanning units;
the detection light emitted by the light source in the optical transceiver assembly is synchronously transmitted by the distributed optical fiber connector assembly to the multiple distributed scanning units; and the multiple distributed scanning units emit the detection light to a detected area through a scanning device;
the distributed optical fiber connector assembly comprises multiple downlink transmission optical fibers connected with the distributed scanning units;
the detection light is emitted from end faces of the downlink transmission optical fibers, such that the end faces of the downlink transmission optical fibers become equivalent light sources; and
the downlink transmission optical fibers are arranged in an one-dimensional array spatially, and a fixture is used to fix the downlink transmission optical fibers as the equivalent light sources in the one-dimensional array, beams of light emergent from the end faces of the multiple downlink transmission optical fibers are incident onto the distributed scanning units at a certain angle with each other to enable scanning fields of view of the beams of light to partially overlap with each other or be immediately adjacent to each other, wherein the incident light forms the scanning fields of view under driving of the distributed scanning units.

2. The LiDAR according to claim 1, wherein the multiple downlink transmission optical fibers are parallel to one another, and the end faces of the multiple downlink transmission optical fibers are of different shapes to enable the beams of light emergent from the end faces to be incident onto the distributed scanning units at the certain angle with each other to enable the scanning fields of view of the beams of light to partially overlap with each other or be immediately adjacent to each other.

3. The LiDAR according to claim 2, wherein the end faces of the multiple downlink transmission optical fibers have different angles of inclined chamfers, and each of the different angles is less than a critical angle C that is defined as:

$$C = \arcsin \frac{n2}{n1}$$

wherein $n_2$ is the refractive index of air, $n_1$ is the refractive index of an optical fiber, and C represents a critical angle of cutting.

4. The LiDAR according to claim 1, wherein the distributed optical fiber connector assembly comprises multiple uplink transmission optical fibers for transmitting a reflected echo received by the scanning device to the optical transceiver assembly.

5. The LiDAR according to claim 1, wherein an optical amplification module is arranged on the downlink transmission optical fibers.

6. The LiDAR according to claim 1, wherein an optical modulation module is arranged on the downlink transmission optical fibers.

7. The LiDAR according to claim 1, wherein each of the multiple distributed scanning units comprises a scanning component, wherein the scanning component includes one of electrostatic galvanometer, electromagnetic galvanometer, piezoelectric galvanometer, or electrothermal galvanometer.

8. A distributed LiDAR, comprising: an internal optical assembly, distributed scanning units, and a distributed optical fiber connector assembly, wherein
   the internal optical assembly is arranged inside a carrier and at least comprises: a light source for emitting detection light;
   the distributed scanning units are distributed on the carrier;
   the distributed optical fiber connector assembly is in connection with the internal optical assembly and in connection with the distributed scanning units;
   the detection light emitted by the light source in the internal optical assembly is transmitted by the distributed optical fiber connector assembly to the distributed scanning units; and the distributed scanning units emit the detection light to a detected area through a scanning device,
   the distributed optical fiber connector assembly comprises multiple downlink transmission optical fibers connected with the distributed scanning units;
   the detection light is emitted from end faces of the downlink transmission optical fibers such that the end faces of the downlink transmission optical fibers become equivalent light sources; and
   the downlink transmission optical fibers are arranged in an one-dimensional array spatially, and a fixture is used to fix the downlink transmission optical fibers as the equivalent light sources in the one-dimensional array, beams of light emergent from the end faces of the multiple downlink transmission optical fiber are incident onto the distributed scanning units at a certain angle with each other to enable scanning fields of view of the beams of light to partially overlap with each other or be immediately adjacent to each other, wherein the incident light forms the scanning fields of view under driving of the distributed scanning units.

9. The LiDAR according to claim 8, wherein the internal optical assembly is arranged in a vibration-stable region inside the carrier.

10. A distributed LiDAR, comprising: an optical transceiver assembly, multiple distributed scanning units and a distributed optical fiber connector assembly, wherein
    the optical transceiver assembly comprises:
      a light source for emitting detection light; and
      a light receiving unit for receiving a reflected echo;
    the multiple distributed scanning units are distributed on a carrier of the distributed LiDAR;
    the distributed optical fiber connector assembly is in connection with the optical transceiver assembly and the multiple distributed scanning units;
    the detection light emitted by the light source in the optical transceiver assembly is synchronically transmitted by the distributed optical fiber connector assembly to the multiple distributed scanning units; the multiple distributed scanning units emit the detection light to a detected area through a scanning device, and receive a reflected echo from the detected area; and the reflected echo is transmitted to the optical transceiver assembly by the distributed optical fiber connector assembly, and received by the light receiving unit in the optical transceiver assembly;
    the distributed optical fiber connector assembly comprises multiple downlink transmission optical fibers connected with the distributed scanning units;
    the detection light is emitted from end faces of the downlink transmission optical fibers such that the end faces of the downlink transmission optical fibers become equivalent light sources; and
    the downlink transmission optical fibers are arranged in an one-dimensional array spatially, and a fixture is used to fix the downlink transmission optical fibers as the equivalent light sources in the one-dimensional array, beams of light emergent from the end faces of the multiple downlink transmission optical fibers are incident onto the distributed scanning units at a certain angle with each other to enable scanning fields of view of the beams of light to partially overlap with each other or be immediately adjacent to each other, wherein the incident light forms the scanning fields of view under driving of the distributed scanning units.

11. The LiDAR according to claim 10, wherein the optical transceiver assembly comprises a light receiving unit; and a filter is arranged between the distributed scanning units and the light receiving unit, and allows for the passage of light within a wavelength range of the detection light emitted by the light source.

12. A distributed LiDAR, comprising: an internal optical assembly, distributed scanning units, and an optical fiber connector assembly, wherein
    the internal optical assembly is arranged inside a carrier and at least comprises:
      a light source for emitting detection light; and
      a light receiving unit for receiving a reflected echo;
    the distributed scanning units are distributed on the carrier;
    the distributed optical fiber connector assembly is in connection with the internal optical assembly and in connection with the distributed scanning units; and
    the detection light emitted by the light source in the internal optical assembly is transmitted by the distributed optical fiber connector assembly to the distributed scanning units; the distributed scanning units emit the detection light to a detected area through a scanning device, and receive the reflected echo from the detected area; and the reflected echo is transmitted to the internal optical assembly by the distributed optical fiber connector assembly, and received by the light receiving unit;
    the distributed optical fiber connector assembly comprises multiple downlink transmission optical fibers connected with the distributed scanning units;
    the detection light is emitted from end faces of the downlink transmission optical fibers such that the end faces of the downlink transmission optical fibers become equivalent light sources; and
    the downlink transmission optical fibers are arranged in an one-dimensional array spatially, and a fixture is used to fix the downlink transmission optical fibers as the equivalent light sources in the one-dimensional array, beams of light emergent from the end faces of the multiple downlink transmission optical fibers are incident onto the distributed scanning units at a certain angle with each other to enable scanning fields of view of the beams of light to partially overlap with each other or be immediately adjacent to each other, wherein the incident light forms the scanning fields of view under driving of the distributed scanning units.

* * * * *